April 19, 1966  G. H. RUDIN  3,246,971
APPARATUS FOR PRODUCING FIBERS
Filed June 14, 1962  3 Sheets-Sheet 1

INVENTOR
George H. Rudin
BY
ATTORNEY

INVENTOR
George H. Rudin
BY John A. McKinney
ATTORNEY

April 19, 1966 G. H. RUDIN 3,246,971
APPARATUS FOR PRODUCING FIBERS
Filed June 14, 1962 3 Sheets-Sheet 3

INVENTOR
George H. Rudin
BY
John A. McKinney
ATTORNEY

United States Patent Office 3,246,971
Patented Apr. 19, 1966

3,246,971
APPARATUS FOR PRODUCING FIBERS
George H. Rudin, Somerville, N.J., assignor to Johns-Manville Corporation, New York, N.Y., a corporation of New York
Filed June 14, 1962, Ser. No. 202,495
5 Claims. (Cl. 65—15)

This invention relates to apparatus for production of glass fibers and is an improvement of the method and apparatus disclosed in U.S. Patents Nos. 2,605,499; 2,605,-503; and 2,952,869. The term "glass" as used herein refers to any composition which has a plastic range rendering it capable of being drawn into fibers or filaments, and while the invention will be particularly described with reference to compositions having working properties similar to those of plate glass, it will be understood that the general principles disclosed herein are applicable to any material falling within the above-recited generic definition of "glass."

A primary problem in the glass fiber industry is to produce, within a given period of time, commercially acceptable fine fiber in such quantity as to make the production economical.

It is an object of the instant invention to provide mechanism for initiating a maximum number of filaments within a given period of time by an apparatus of a particular size and attenuating these filaments into long, fine fibers.

The foregoing object is accomplished in accordance with the instant invention by a pair of coacting rotors having conical faces over which filament-forming materials are spread and from which the filaments are initiated and removed to an area where they may be conveniently attenuated and distributed to a collection zone.

The above and other objects will be clear from the following description when considered in connection with the drawings wherein.

Figure 1:
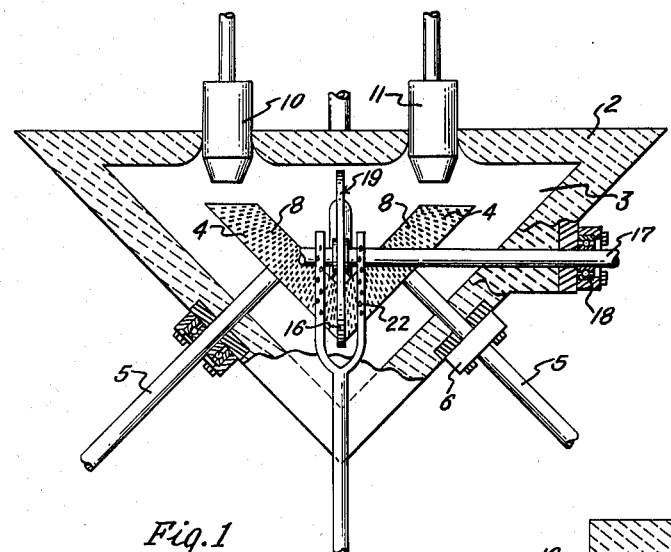
FIG. 1 is a transverse vertical sectional view through one form of the apparatus.

Referring now to the details of the drawings there is shown in FIG. 1 one form of fiber-forming equipment comprising a housing 2 enclosing the fiberizing chamber 3 and supporting, or at least enclosing, the operating elements of the equipment within chamber 3. In this form the rotors 4 are carried by rotary shafts 5 mounted in bearings 6, the axes of the shafts being each approximately 45° from the vertical plane between them. Each rotor is formed with a filament-forming surface 8 of frusto-conical form, herein generally referred to as "conical," so that with the rotors placed in coacting operative position, as shown, they present contiguous surfaces, almost in contact at the center line, indicated at L, where they most nearly approach one another. All rotor shafts herein are connected to a suitable source of power, not shown, so that they can be rotated at the desired relatively high speed required for the production of a substantial quantity of fine fiber.

For convenience the face of the rotors, terminating in the end of the frusto-conical surface of smaller diameter is referred to herein as the "outer face." The portion of the filament-forming surface of greater diameter is thus positioned at the inner face of the rotor.

The conical surfaces 8 of the rotors in this and other forms of the invention may be smooth but it is preferred these surfaces be provided with upstanding protuberances, as indicated by the dots and dashes in the drawings, in the form of gear teeth, knurls, ridges or other projections to provide closely spaced extensions from which filaments are drawn as points on the rotor surfaces approach and recede from one another.

Figure 2:
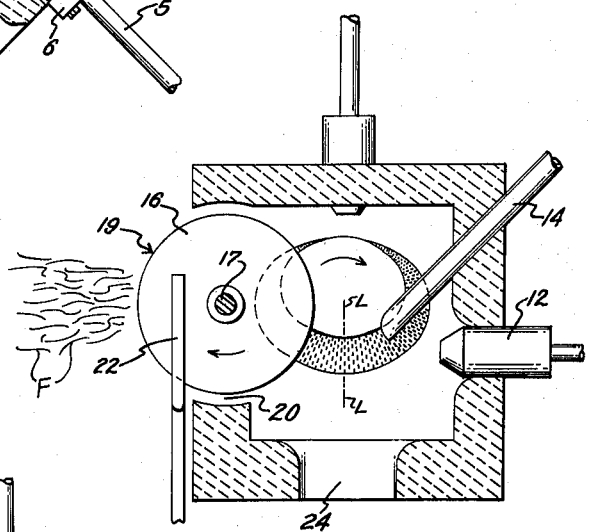
FIG. 2 is a longitudinal vertical sectional view thereof, taken at right angles to FIG. 1.

In FIGS. 1 and 2 the conical filament-forming surfaces 8 of the rotors are heated by the two top burners 10 and 11 and by a rear burner 12. The burners 10 and 11 point their flame directly toward the top surfaces of the rotors while the flame from burner 12 is directed at the line of approach of the filament-forming surfaces, the line from which filaments are initiated. The viscous charge material from which the filaments are formed is introduced through a spout or trough 14, the material being discharged in a small steady stream high on the rotor surfaces 8, substantially at or preferably immediately in advance of the line of approach of the rotor surfaces. The flame from burner 12 thus assists in the application of the charge material to the filament-forming surfaces and in spreading the charge material over these surfaces.

The expression line of approach herein, indicated by the letter L, is used in the same sense as line of contact for contacting beveled cones or gears. In the instant invention it is preferred there be no actual contact between the coacting surfaces 8 of the two rotors although for certain forms of protuberances the projections on one such surface may well enter within the outer confines of the other rotor surface 8, between the protuberances thereon.

A picker roll, in the form of a disk or wheel 16, contacts the intermediate portions of the formed filaments to attenuate them into long, fine fibers. The roll 16 is mounted on a transverse shaft 17, mounted in one or more bearings 18. It is formed as a thin disk, preferably having a toothed or knurled outer surface or rim 19 for facilitating attachment of the filaments to the roll as the filaments are pressed against the outer rim of the roll. The inner peripheral portion of roll 16 projects to a point near the line of approach of the filament-forming surfaces 8, the roll extending outwardly at its opposite peripheral edge, through the fiber discharge opening 20 in the housing 2 (FIG. 2). The filaments are thus contacted near their point of formation and drawn by their mid-portions to a point without the housing. An air jet 22, supplied with air under suitable compression from a source, not shown, directs an air stream, or other types of fluid stream, outwardly against both faces of the roll where it projects from the housing, thus forcing the fibers F off of the roll 16 to a collection station, not shown. Any unfiberized material accidentally released within the housing falls downwardly through the bottom discharge opening 24 in the housing.

It will be noted the rim portion of picker wheel 16 where it is contacted by the newly formed filaments is substantially perpendicular to the length of the filaments being drawn and elevated by the rotors. Since the picker roll 16 rotates in a clockwise direction, as viewed in FIG. 2, the mid-portions of the filaments are carried downwardly and forwardly by the picker roll as the ends of the filaments are carried upwardly and away by the rotor surfaces. This action provides immediate stretching tension to the filaments while they still retain their heat, resulting in the production of unusually long fine fibers.

While the housing is shown in most of the views as of triangular construction, it is to be understood this is merely for convenience of illustration and actually the housing may be cubical, spherical or any other shape. The housing is preferably formed of or lined with insulating material to reduce the heat loss therefrom, since most material to be fiberized are heat softened and they must retain sufficient heat to facilitate fiber formation and attenuation. The bearings are shown as mounted on the housing herein, however, it will be understood they may well be fixedly mounted on an exterior frame and the insulating lining introduced to form the fiberizing chamber.

Figure 3:
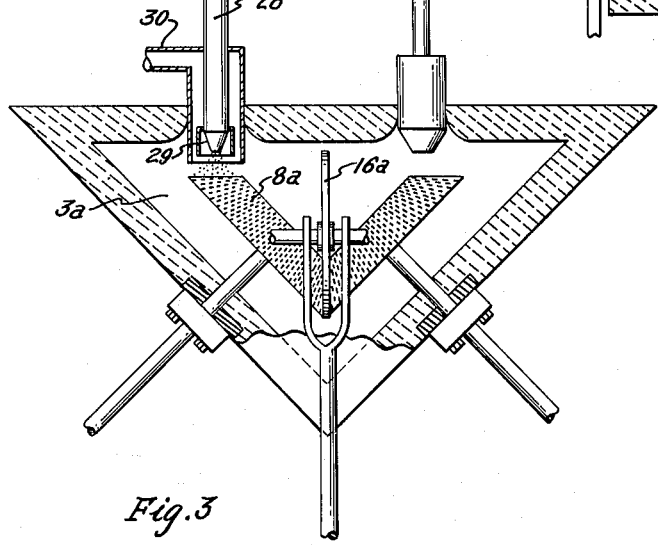
FIG. 3 is a transverse vertical sectional view, similar to FIG. 1, illustrating a modified form of the equipment.

Refering now to FIG. 3, the construction is the same as that described above except that in this modification the material from which the filaments are formed is introduced in particulate form and heat liquified as it is projected into the chamber 3a. Thus there is provided a supply 26 of particles of materials to be formed into filaments, with a metering device 27 for controlling the discharge of particles through the pipe 28. The pipe 28 opens at its lower end into a torch nozzle 29, supplied with combustible fluid from pipe 30. The flame from the torch picks up the particles, softens them to a viscous stage as they are blown toward and against the rotor surface 8a to which they adhere. The viscous material is then transferred in part to the other filament-forming surface and filaments are formed and attenuated into long, fine fiber and removed by picker roll 16a as hereinabove described.

Figure 4:
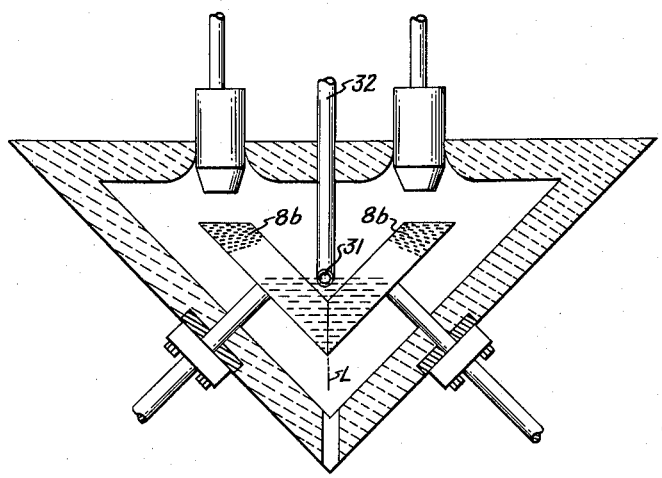
FIG. 4 is a transverse vertical sectional view of a further modification.
Figure 5:
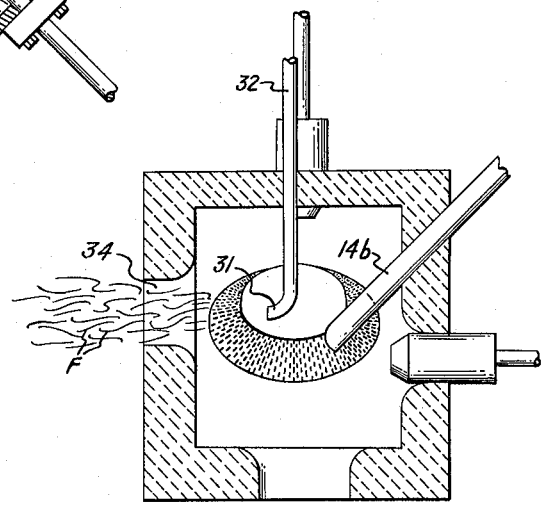
FIG. 5 is a central longitudinal vertical sectional view taken at right angles to FIG. 4.

In FIGS. 4 and 5 the construction and operation are as described above except that an air jet is substituted for the picker roll. Thus, the filaments initiated in front of the line of approach between rotor surfaces 8b, supplied by charge material through trough 14b, are attenuated moderately as they are elevated and advanced to a point about midway of the height of the fiberizing surfaces. Here they are contacted by a strong blast of air or other fluid from outlet nozzle 31 of supply pipe 32, to attenuate the filaments into long, fine fibers F and carry them outwardly through side opening 34 to a point of collection.

The particular advantages of the construction shown in FIGS. 4 and 5 are that the number of moving parts is reduced and there is less filament breakage and better opportunity to produce longer, finer fibers.

Figure 6:
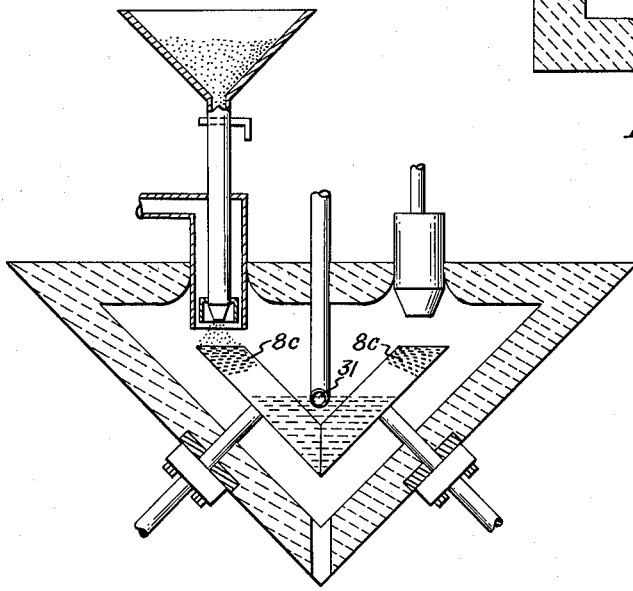
FIG. 6 is a transverse vertical sectional view illustrating a further modification of the invention.

FIG. 6 illustrates the use of the burner projector 29 of FIG. 3 for softening and applying the heat-softened particles to rotor surface 8c and attenuating and removing the formed filaments by means of an air blast from nozzle 31. This view illustrates the interchange-ability of the feeding devices of FIG. 3 with the filament attenuation and removal mechanism of FIGS. 4 and 5.

Figure 7:
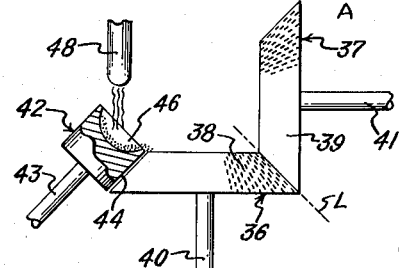
FIGS. 7, 8 and 9 are similar transverse vertical sectional views illustrating a series of further modifications of the apparatus, with the housing and fiber removing devices omitted.

FIG. 7 illustrates a different type of feed for the viscous materials and rotors mounted in the same relations but in different positions. Thus the rotors 36 and 37 have the same form of conical filament-forming surfaces 38 and 39 as described above but they are mounted for rotation on vertical shaft 40 and horizontal shaft 41, respectively, providing a diagonal line of approach L. There is provided an additional rotor 42 mounted on shaft 43, positioned directly opposite rotor 37 and preferably rotating at a moderately lower peripheral speed than rotors 36 and 37. Rotor 42 is formed with an exterior or side surface 44 of generally smooth cylindrical form and with a dished end wall or face 46. The rotor 42 is mounted with a side surface 44 contiguous to the filament-forming surface 38 of rotor 36 to form a line of approach between these surfaces. The axis of rotation of rotor 42 and shaft 43 is thus approximately 45° from the vertical.

The material from which the filaments are to be formed is poured from a trough or pipe 48 into the open dished pocket 46 as the rotors are operated. Rotation of rotor 42 causes the material to be moved to the outer edge of the dished end 46 where the material is continuously thrown or wiped off onto rotor 36 at the outer or upper edge of the filament-forming surface 38. Rotation of rotors 36 and 37 causes the charge material to be moved along the conical filament-forming surface 38 and the charge material to be gradually spread over both rotor surfaces 38 and 39 with the production of fibers between these surfaces during such rotation. The cylindrical outer surface 44 of rotor 42 serves to rub and smooth the material on the adjacent surface 38, opposite the rotor surface 39, and to assure a smooth, even transfer of the material from one rotor to the other, with more uniform filament production.

To avoid duplication of disclosure, the constructions illustrated in FIGS. 7, 8, 9 and 12 are shown without insulating housings and without their fiber attentuation and removal devices. It is to be understood that the picker wheel mechanisms of FIGS. 1, 2, 3, 10 and 11 or the air blast nozzle devices of FIGS. 4, 5 and 6 will be used for attenuating the filaments initiated by the coacting rotors of FIGS. 7, 8, 9 and 12 into long, fine fibers and removing the fibers to a collecting zone with the picker wheels or air blast nozzles positioned the same with respect to the line of approach of the two rotor filament-forming surfaces and operating the same as herein described.

Figure 8:
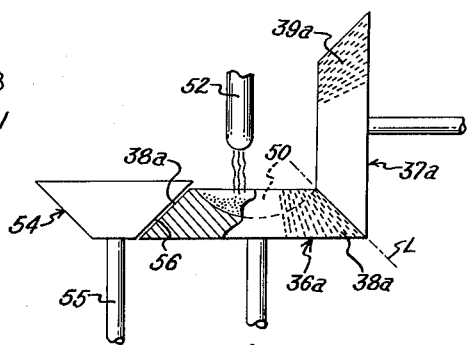

In FIG. 8 the coacting rotors 36a and 37a with their respective conical filament-forming surfaces 38a and 39a are mounted for rotation the same as in the FIG. 7 form, with an angular line of approach L. The rotor 36a has an open dished face 50 for receiving viscous charge material supplied by pipe or trough 52. The material forced outwardly from the pocket 50 is spread over the conical surface 38a by contact with the opposed rotor surface 39a. Where a large volume of material is being formed into filaments it is necessary to provide a secondary smoothing roll for the portion of rotor surface 38a remote from rotor surface 39a. Thus, there may be provided a smoothing rotor 54, mounted on shaft 55 and formed with smooth surface 56 contiguous to the surface 38a of rotor 36a. In the form shown rotors 36a and 54 rotate about parallel axes. Thus, the smooth surface 56 of rotor 54 serves to iron out and distribute the material on surface 38a, providing a smooth, even transfer of material to the coacting surface 39a. The angle of rotation and form of the smoothing surface 56 of rotor 54 are not critical, except that the smoothing surface 56 must be contiguous to and substantially parallel to the opposed surface 38a at the line of approach between these surfaces. With the construction shown, with the axes of rotation of rotors 36a and 54 parallel, there is an advantage in that there is a distinct rubbing or ironing action between these surfaces even if they should be rotated at about the same peripheral speed. However, the peripheral speed of rotor surface 56 is preferably substantially less than that of rotor surface 38a and with heavy viscous material being formed into filaments, the smoothing rotor 54 can be an idler, without being driven as are the other rotors disclosed.

Figure 9:
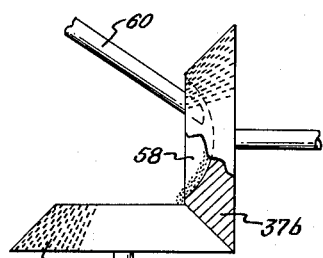

In FIG. 9 the coacting rotors 36b and 37b are mounted as described in connection with FIG. 7 and with corresponding conical filament-forming surfaces. The rotor 37b, rotating on a horizontal axis, is formed with a dished face 58 into which the charge material is introduced through the spout 60. This material is spread outwardly and continuously thrown or wiped off onto the upper surface of rotor 36b and spread over the conical filament-forming surfaces of the rotors for the production of filaments as above described.

Figure 10:
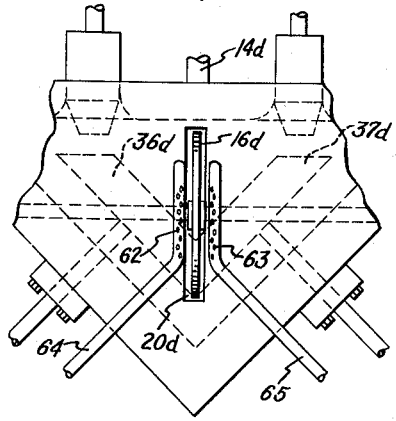
FIG. 10 is a front elevation of a further modified form of the equipment, parts being broken away.
Figure 11:
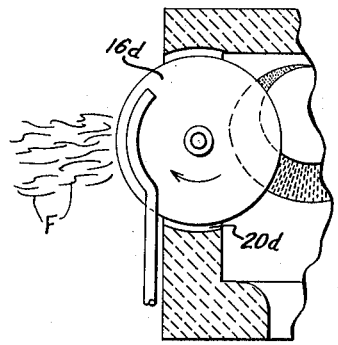
FIG. 11 is a fragmentary central longitudinal sectional view of the construction shown in FIG. 10.

In FIGS. 10 and 11 the relation of the rotors 36d and 37d, picker roll and charge-introducing spout 14d are shown in FIGS. 1 and 2. In this modification the fiberized materials are removed from the picker roll 16d, where it extends outwardly through opening 20d, by means of separate air jets 62 and 63 positioned closely adjacent the outwardly projecting portion of the picker roll 16d. The jets 62 and 63 are carried by and supplied with air or other fluid under high pressure by supporting pipes 64 and 65 extending angularly toward the opposite faces of the picker roll. It will be noted that in this construction the air jet pipes are positioned away from the discharge opening 20d, thus avoiding interference with even the longer attenuated fibers. The jets 62 and 63 may be curved to provide a discharge blast over a substantial portion of the perimeter of the picker roll, as shown.

Figure 12:
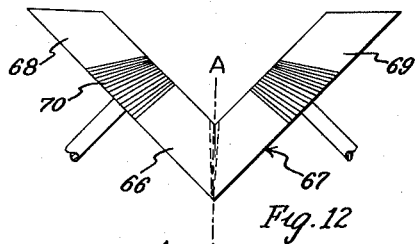
FIG. 12 is a front elevation illustrating rotors of modified form with the casing removed and with the feeding and fiber removal devices omitted.
Figure 13:
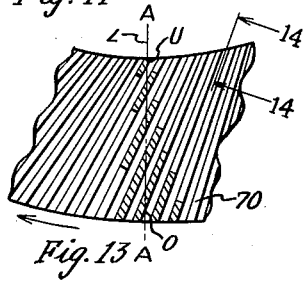
FIG. 13 is an enlarged face view of one of the rotors of FIG. 12, parts being shown in section.
Figure 14:
FIG. 14 is a fragmentary sectional view of one of the gear teeth, taken on the line 14—14 of FIG. 13.

The modification illustrated in FIGS. 12, 13 and 14 involves beveled gear teeth which are preferably interlocking but which remain out of contact. The mounting shafts, charge supply, fiber removal and insulated housing are as described above, in connection with FIG. 1, for example. The rotors 66 and 67 are formed with conical filament-forming surfaces 68 and 69, formed as coacting spiral gear teeth 70. These teeth, which extend outwardly and rearwardly at the line of approach A are preferably formed with individual protuberances 72 along their outer surfaces (see FIG. 14) to provide a multitude of points from which filaments are initiated. The angle of the teeth is not critical but the angular mounting of the rotors should be such as to provide greater spacing adjacent the outer, upper ends of the teeth, thus providing an automatically regulated reservoir for charge material. Thus, the teeth at the lower or inner point O are closely meshed to provide very little room for charge material while the upper end or outer ends, at the point U, are separated to provide a reservoir for charge material, constantly moved downwardly or inwardly by centrifugal force and forced outwardly or upwardly by the limited space between the inner ends of the teeth. The width of the teeth will necessarily be greater at their inner, lower ends O, due to their conical formation, and narrower at their upper or outer ends U. Excess charge material is thus forced to substantially fill the space between the teeth, with a minimum loss of material from the outer ends of the teeth. Since the excess can be observed through a sight opening in the housing, there is provided a ready control which will permit maximum filament production without wastage.

The spiral gear teeth are preferably made very small and of rounded configuration to provide a great number of points 72 from which filaments are initiated. The gear teeth in FIGS. 12 and 13 are necessarily shown enlarged for clear illustration. The angle of the two sets of teeth at the angle of approach may be as indicated, at the line A—A in FIG. 10, where the upper ends of the teeth are almost out of mesh and the lower ends are fully enmeshed and almost, if not actually, in contact.

The operation of the various forms of the invention will be clear from the above description. The charge is supplied in viscous form from a molten supply, by means of a supply trough, either directly to the rotors adjacent the line of approach of the conical filament-forming surfaces, or by discharge into a cupped surface on or adjacent one of the rotors, or the materials may be carried in as solid particles and heat-softened as they pass to the filament-forming surfaces. When the material has been placed on or near the inner edge of the conical filament-forming surfaces the centrifugal force, in most cases assisted by gravity, tends to cause an outward flow of the material across the filament-forming surfaces. Rapid and repeated contact of the filament-forming surfaces with the material spreads the material evenly over the surfaces. At the same time these surfaces initiate myriads of individual filaments which are stretched out a short distance and moved upwardly and forwardly to a position where they are contacted by a picker roll or air blast which serves to attenuate the filaments into long, fine fibers and discharge them from the chamber.

It will be understood that the size of the filament-forming rotors and the picker roll, and their speed of rotation will vary, depending upon the materials being fiberized and the volume and length of fiber desired. In general it may be stated that the filament-forming rotors may be from 3" to 10" or more in diameter and that they may be rotated to provide a peripheral speed of for 1,000 to 1,500 ft./min. for best operation. The picker roll, which should be thin, that is ⅛" to ¼" in thickness, may be from 6" to 15" in diameter and will preferably be rotated at a speed to provide a peripheral speed of from 4,000 to 6,000 ft./min.

The rotors and picker roll should be formed of material which will withstand the temperature to which they will be subjected. The temperature of the charge at the filament-forming surfaces may well be 1800° F. or higher for inorganic glass-type materials but will be considerably lower for organic materials. Thus, the rotors and picker roll may be formed of stainless steel or nickel-chrome alloy or of high carbon steel, depending upon the service required.

The bevel of the filament-forming surfaces may be from 30° to 60° from the axis of rotation of the rotors with satisfactory results. The angle of approximately 45° shown in the several figures of the drawings has been found to be entirely satisfactory.

The air pressure for removing the fibers from the picker roll is not critical, in that a moderate pressure of 5 to 10 lbs./sq. in. will suffice. The pressure at the attenuating nozzles 31 of FIGS. 4, 5, 6, 10 and 11 should be higher, up to 65 lbs./sq. in., although a pressure of about 20 p.s.i. has in general been found to be best, to avoid undue cooling of the fibers being attenuated. Also, other fluids such as steam or a gaseous blast may be substituted for the air.

The angle of the conical filament-forming surface to the axis of rotation of the rotors is shown as approximately 45° in the several figures. This angle can be varied within limits, that is, an angle between 30° to 60° is considered satisfactory although the 45° angle as shown is considered preferable, for convenience and effectiveness in removing fibers. With this construction a simple axial adjustment of one or both rotors is all that is required to adjust the spacing between the rotor surfaces.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. Apparatus for forming fibers from a viscous material, comprising a first and a second rotor mounted for rotation on axes substantially out of parallelism, said rotors being provided with coacting peripheral filament-forming surfaces each of which extends at an angle to its axis of rotation and with said filament-forming surfaces at one circumferential point in contiguous, closely spaced relation to one another, constituting a line of approach to said surfaces, means for rotating said rotors, means for applying a viscous material to said surface of said first rotor and to cause said material to be moved into contact with the surface of the second rotor adjacent said line of approach to cause filaments to be drawn from said material as said rotors continue to rotate past said line of approach, means for spreading out and smoothing over said viscous material applied to said surface of said first rotor, said means for spreading out and smoothing over said material comprising a third rotor having a peripheral surface positioned to be contiguous at one circumferential location to the filament-forming surface of said first rotor, means for rotating said third rotor at a peripheral speed less than the peripheral speed of said first rotor, said means for applying said viscous material to said surface of said first rotor comprising a dished end on the axial extremity of one of said rotors, means for introducing viscous material to said dished end, said rotation of said rotors causing said viscous material to move over the edge of said dished end and to flow over said surface of said first rotor and to pass between and be contacted by the contiguous surfaces of said first and third rotors so as to be spread out and smoothed over said surface of said first rotor so that a plurality of filaments may be formed from said filament-forming surfaces of said first and second rotors as they pass through said line of approach.

2. Apparatus as defined in claim 1 wherein said dished end is on said first rotor.

3. Apparatus as defined in claim 1 wherein said dished end is on said third rotor.

4. Apparatus as defined in claim 1 and further comprising corresponding enmeshed spiral gear teeth on said filament-forming surfaces extending outwardly and inclined rearwardly with respect to the direction of rotation of said rotors to cause said teeth to become enmeshed first at their portions of greater diameter and to separate later at their portions of lesser diameter during rotation of said rotors.

5. Apparatus as defined in claim 4 wherein said gear teeth are formed with a series of protuberances on the radially outward surfaces thereof.

References Cited by the Examiner

UNITED STATES PATENTS

| | | | |
|---|---|---|---|
| 2,398,707 | 4/1946 | Hawthorne et al. | 65—15 |
| 2,520,169 | 8/1950 | Powell | 65—15 X |
| 2,605,500 | 8/1952 | Powell | 65—6 |
| 2,605,503 | 8/1952 | Powell | 65—6 |
| 2,632,920 | 3/1953 | Koehler | 65—14 X |
| 2,729,029 | 1/1956 | Slayter | 65—15 X |
| 2,952,869 | 9/1960 | Powell | 65—15 X |
| 3,060,498 | 10/1962 | Rubissow | 65—14 |
| 3,159,475 | 12/1964 | Chen et al. | 65—15 |

FOREIGN PATENTS

| | | |
|---|---|---|
| 531,514 | 10/1956 | Canada. |
| 1,070,187 | 2/1954 | France. |

DONALL H. SYLVESTER, *Primary Examiner.*